Sept. 2, 1941.     A. R. JOHNSON ET AL     2,254,871
INFORMATION DEVICE
Original Filed June 15, 1938    2 Sheets-Sheet 1
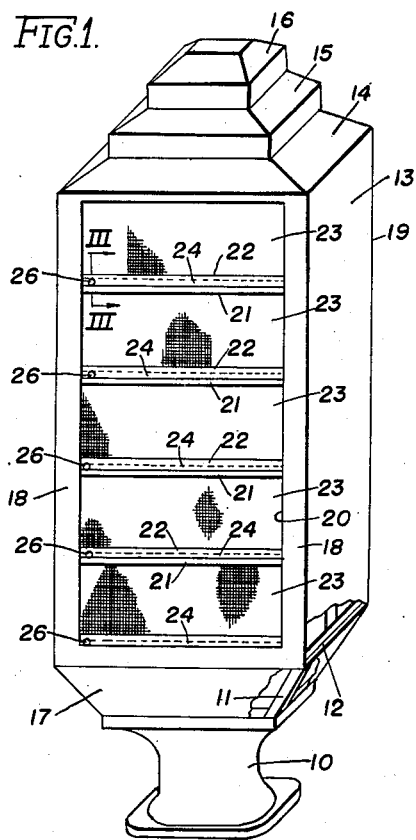
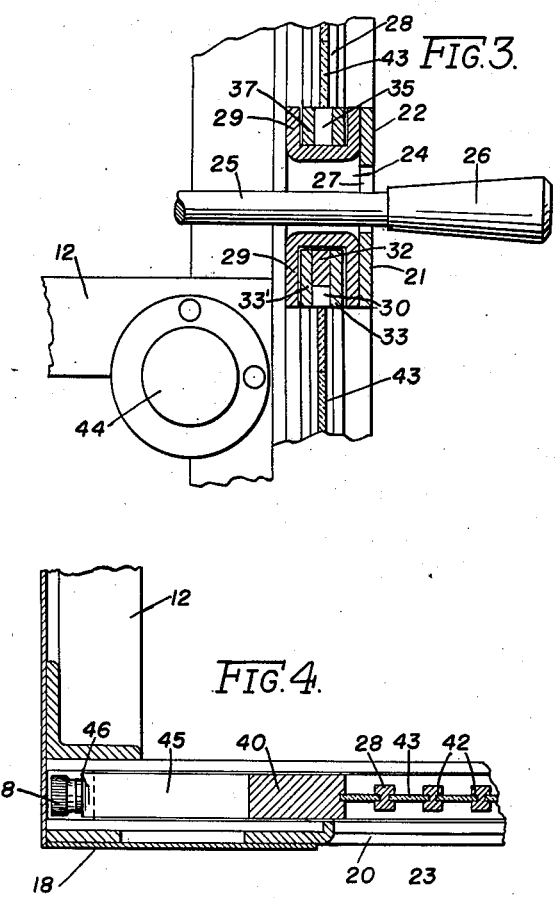
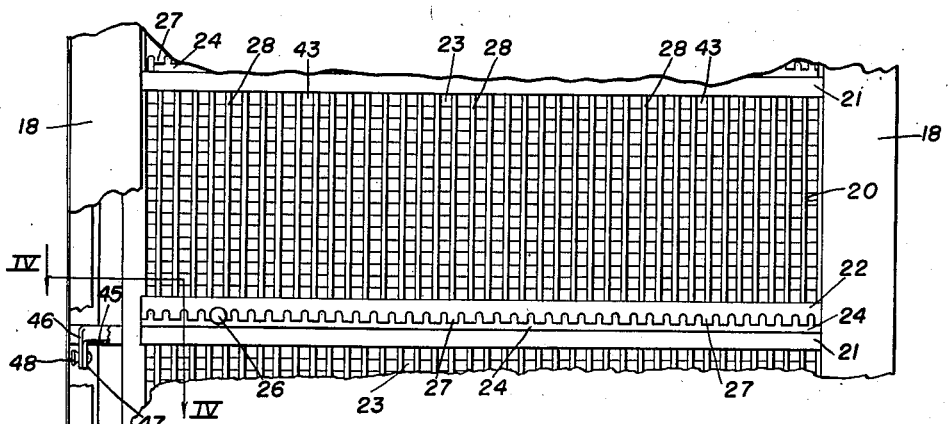
INVENTORS.
ANDREW R. JOHNSON.
CHARLES E. WATSON.
BY
ATTORNEY.

Sept. 2, 1941.  A. R. JOHNSON ET AL  2,254,871
INFORMATION DEVICE
Original Filed June 15, 1938   2 Sheets-Sheet 2
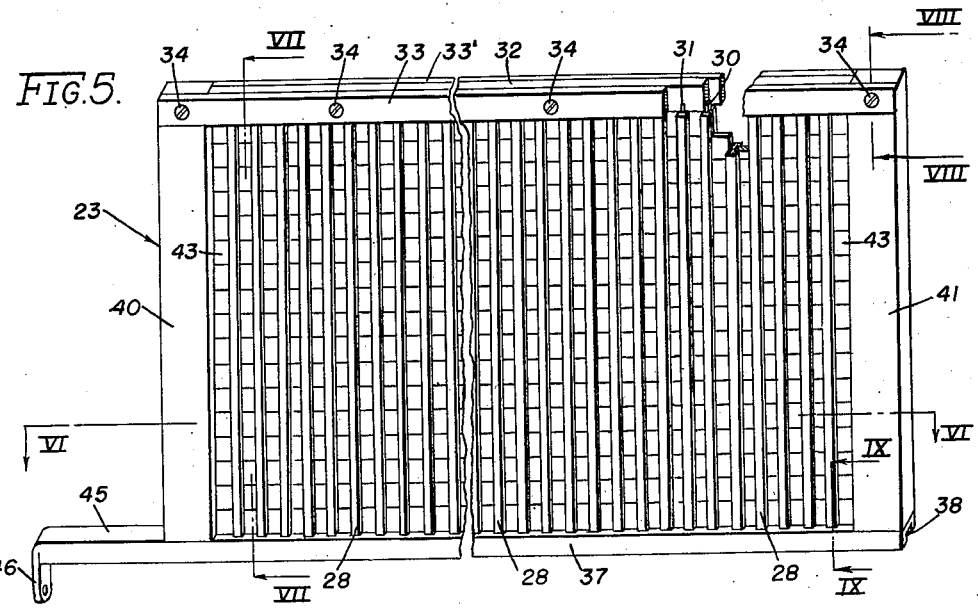
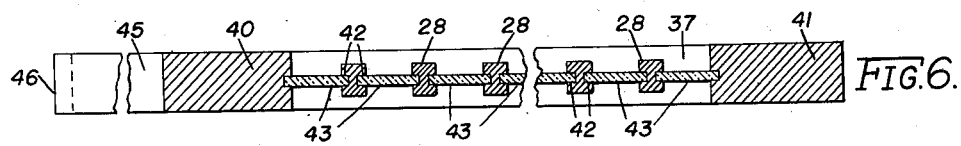
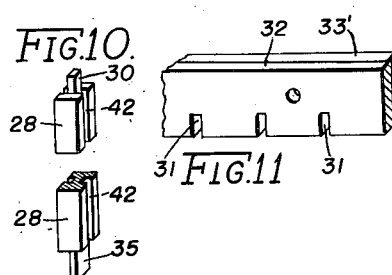
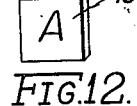
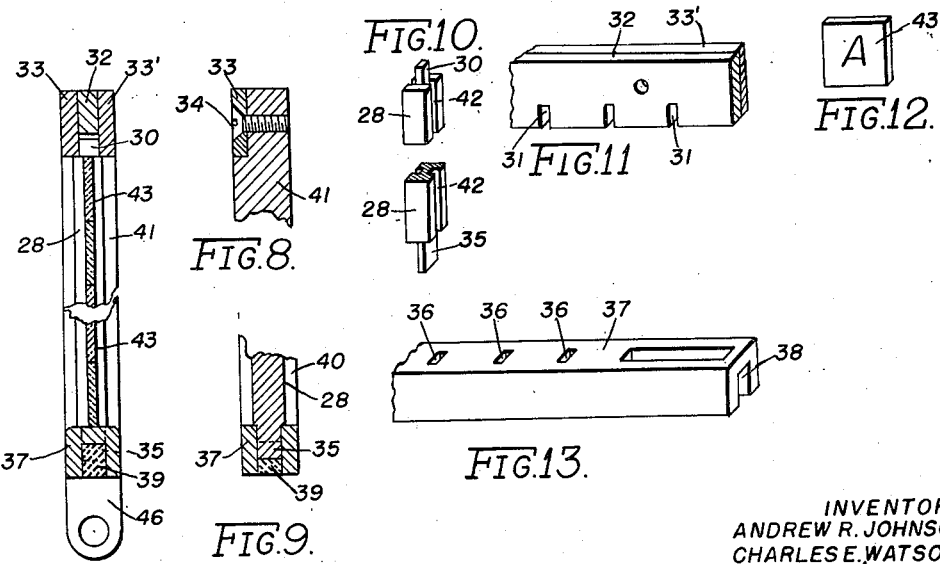
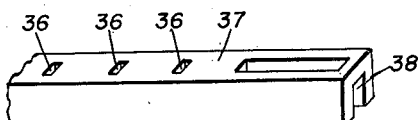
INVENTORS.
ANDREW R. JOHNSON.
CHARLES E. WATSON.
BY
ATTORNEY.

Patented Sept. 2, 1941

2,254,871

UNITED STATES PATENT OFFICE 2,254,871

INFORMATION DEVICE

Andrew R. Johnson, Chicago, and Charles E. Watson, La Grange, Ill., assignors, by direct and mesne assignments, to The Informat Company, Chicago, Ill., a corporation of Illinois Original application June 15, 1938, Serial No. 213,798. Divided and this application October 24, 1938, Serial No. 236,658

2 Claims. (Cl. 40—64)

This invention relates to information devices and more particularly to an adjustable indexing device constituting a part of a cabinet for multiple record selectors for installation in public places and operable to supply audible talk-back on diverse matters of interest from an advertising and information service standpoint, although the adjustable indexing cabinet structure may be employed with equal advantage for other purposes.

It contemplates more especially a novel indexing cabinet structure for confining and cooperating with multiple records operatively connected to a talk-back selector in a self-contained unit to supply information and various advertising features depending upon the demands and requirements of commercial practice. This application is a division of our co-pending application Serial Number 213,798 and filed June 15, 1938, Patent No. 2,216,114, October 1, 1940.

It is a familiar fact that travellers and newcomers arriving in municipalities or public places frequently experience difficulty and delay in securing necessary and desired information. Often residents or people who are well informed are not available or convenient to approach and the newcomer is apt to be misdirected and suffer embarrassment or delay. Further, a person arriving in a strange locality at a late hour may find places of information closed and neighborhoods deserted so that it is often very difficult to acquire information.

Then, too, effective advertising can be acquired by informing individuals through a mechanical record-reproducer unit that is selective, amusing and effective in communicating information and advertising messages. It is proposed, therefore, to provide self-contained information machines in depots, public places, and prominent street intersections for contemplated operation day and night to impart spoken information and advertising concerning hotels, streets, office buildings, and other subjects of public interest to persons soliciting such information.

One object of the present invention is to provide an adjustable indexing cabinet front for cooperating with multiple records for the purpose set forth.

Another object of the invention is to provide novel means for adjustably indexing records and the like in a selective multiple record playing or similar device.

Still another object is to provide multiple preformed records in a self-contained device with improved indexing means for selective response through a reproducer.

A further object of the invention is to provide an audible mechanical information device having control means cooperating with improved indexing means for the selection of the desired message reproduction.

A still further object of the invention is to provide a device of the character mentioned with a cabinet having improved adjustable indexing instrumentalities to guide the operation of the confined instrumentalities.

Still a further object is to provide a multiple reproducer capable of being readily varied from time to time for announcing selected messages through the use of improved indexing device therefor.

Other objects and advantages will appear from the following description of an illustrative embodiment of the present invention.

In the drawings:

Figure 1 is a perspective view of a device embodying features of the present invention.

Figure 2 is an enlarged fragmentary front view in elevation of the device shown in Figure 1, parts thereof being broken away to clarify the showing.

Figure 3 is a sectional view taken substantially along line III—III of Figure 1.

Figure 4 is a sectional view taken substantially along line IV—IV of Figure 2.

Figure 5 is a perspective view of a letter block which constitutes a part of the cabinet front shown in Figure 1, parts thereof being broken away to clarify the showing.

Figure 6 is a sectional view taken substantially along line VI—VI of Figure 5.

Figure 7 is a sectional view taken substantially along line VII—VII of Figure 5.

Figure 8 is a sectional view taken substantially along line VIII—VIII of Figure 5.

Figure 9 is a sectional view taken substantially along line IX—IX of Figure 5.

Figure 10 is a fragmentary perspective and sectional view of a letter block guide shown in Figure 6.

Figure 11 is a fragmentary perspective view of a guide retainer bar shown in Figure 5.

Figure 12 is a perspective view of a letter block utilized with guides of the type shown in Figures 5 and 6.

Figure 13 is a fragmentary perspective view of a bottom channel bar.

The structure selected for illustration comprises a base 10 of any suitable configuration and construction that may be cast or otherwise shaped to serve as an ornamental standard of any heighth. The base 10 has an upwardly extending structural frame work extension 11 which serves to support a superposed frame 12 that is somewhat wider than the base extension framework 11 to define an outline for a substantially rectangular casing 13. The casing 13 terminates upwardly, in this instance, in a series of pyramided frusto-conical terrets 14, 15 and 16 to define any desired ornamental and visual effect which may be varied within a wide range to meet the dictates of commercial practice.

As shown, the casing 13 extends downwardly in a converging apron 17 that merges with the upper edge of the base 10 to define an impressive casing for instrumentalities to be hereinafter described. In this instance, the casing 13 has its front and rear walls 18 and 19, respectively, provided with substantially rectangular openings 20 that comprise the greater part of the wall surface to accommodate an informational device capable of variation to correspond with records confined within the casing 13. To this end, each of the openings 20 in the front and rear walls 18 and 19 are provided with a plurality of transverse bars 21—22, in this instance constituting confronting sets of five in each opening 20, these being equi-distantly spaced to define a corresponding number of separate informational areas 23 that are independent of each other and correspond with separate self-contained instrumentalities numbering, in this instance, a total of ten units on both sides. The number of units and records therein and the capacity of each unit and casing 13 may be varied within a wide range and depends largely upon the requirements as well as the size thereof.

It is to be noted that the transverse sets of bars 21—22 are spaced to present transverse slots or openings 24 therebetween to permit vertical displacement within the limits of a control handle 25 that terminates externally in a grip member 26. The lower edge of the transverse plate members 22 are provided with downwardly extending horizontally spaced teeth 27 that accommodate the handle control shank 25 therebetween so as to index such in vertical alignment with the spaces between vertically upstanding struts 28 that are anchored in confronting guide members 29.

As shown, the confronting guide members 29 (Figure 3) are substantially U-shaped and are attached to the transverse plate members 21—22 so as to receive the struts 28 therein. The struts 28 have their upper reduced extremities 30 disposed in notches 31 provided in plates 32 detachably connected between spaced side members 33—33' by means of threaded studs or screws 34 (Figures 5 and 6). The lower strut extremities 35 are soldered, welded or otherwise anchored in notches 36 provided in channelled bars 37 to define a unitary frame casing section 23 (Figure 5) which may be assembled and dismantled by removal of the fastener studs 34; however, there is sufficient freedom of movement so as to enable the entire sections 23 with their struts 28 to be slidably removed in a horizontal direction.

The channel 38 serves to retain the solder or other securing material 39 so as to securely hold the struts 28 in position. Side members 40 and 41 are similarly attached to the members 31—37 to confine the struts 28 therebetween in uniformly spaced relation therewith. The struts 28 are provided with longitudinally extending grooves 42 formed on both lateral or side walls thereof so as to confront the corresponding grooves in the adjacent struts 28 to retain superposed indicia or letter blocks 43 therebetween. In order to remove the informational sections 23 and to enable a speedy change therein, the entire panel section 23 can be laterally removed from the casing 13 and the top side plates 33—33' dis-engaged to permit different indicia blocks 43 to be inserted or substituted.

The indicia or letter blocks 43 are slidably received between the confronting vertical grooves 42 provided in the struts 28 so as to define any vertical word or informational indicia for use by the public in indexing the handle member 26 of the control 25 to conform with any special series of letter blocks 43 that will be disposed in vertical alignment between the teeth 27 constituting an indexing member for each of the informational areas or sectors 23. The indicia or letter blocks 43 may be composed of translucent Bakelite or other plastic compositions so as to emanate light therethrough from a source of illumination such as an electric bulb 44 mounted within the casing 13. This provides the adjustable informational areas or sections 23 which can be readily varied to conform with the changes made in the records that are disposed on operating instrumentalities confined within the casing 13 to produce audible informational projection in a manner described in our copending patent application serially numbered 213,798 and filed June 15, 1938, Patent No. 2,216,114, October 1, 1940.

It is preferable though not essential that the side walls 12 (Figure 1) of the casing 13 be rendered removable so that each self-contained operating unit for each informational section 23 will be readily removable for repair, replacement, or record changing. For that matter, each front informational section 23 may be rendered removable as a unit for a similar purpose depending upon the dictates of commercial practice. To this end, the lower channel members 37 terminate in an extension 45 which has a perforated offset ear 46 (Figure 5) disposed in registry with a correspondingly shaped and confronting frame bracket 47 to receive a fastener or bolt 48 therebetween (Figure 2) in order to retain the assembled section 23 in position against removal from the casing 13.

Various changes may be made in the embodiment of the invention herein specifically described without departing from the invention or sacrificing any advantages or features thereof, and nothing herein shall be construed as limitations upon the invention, its embodiment, or structural concept as to the whole or any part thereof, except as defined in the appended claims.

We claim:

1. In a device of the character described, the combination with a casing having an opening in a wall thereof, of a plurality of vertically disposed bars bridging said casing opening, there being vertical confronting grooves in said bars, superposed indicia members in said grooves between said bars to serve as an enclosure for said casing opening, indexing means on said casing for the spaces between said bars, and means cooperating with said indexing means and movable to a position of alignment with each vertical series of indicia members to control instrumentalities responding thereto.

2. In a device of the character described, the combination with a casing having an opening in a wall thereof, of a self-contained frame unit disposed in said casing opening, means for detachably securing said frame unit in said casing opening, a plurality of vertically disposed bars bridging said frame unit, there being vertical confronting grooves in said bars, translucent indicia members disposed in superposed relation along said grooves between said bars to serve as an enclosure for said casing opening, and means for indexing an operating control relative to said superposed indicia blocks.

ANDREW R. JOHNSON.
CHARLES E. WATSON.